US009767086B2

(12) United States Patent
Vidhani et al.

(10) Patent No.: US 9,767,086 B2
(45) Date of Patent: Sep. 19, 2017

(54) SYSTEM AND METHOD FOR ENABLEMENT OF DATA MASKING FOR WEB DOCUMENTS

(71) Applicant: Tata Consultancy Services Limited, Mumbai (IN)

(72) Inventors: Kumar Mansukhlal Vidhani, Pune (IN); Gangadhara Reddy Sirigireddy, Pune (IN); Arun Kumar Jindal, Pune (IN); Manish Shukla, Pune (IN); Vijayanand Mahadeo Banahatti, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 5 days.

(21) Appl. No.: 15/069,504

(22) Filed: Mar. 14, 2016

(65) Prior Publication Data

US 2017/0154021 A1 Jun. 1, 2017

(30) Foreign Application Priority Data

Nov. 26, 2015 (IN) ........................ 4444/MUM/2015

(51) Int. Cl.

*G06F 17/00* (2006.01)
*G06F 17/22* (2006.01)
*G06K 9/00* (2006.01)

(52) U.S. Cl.

CPC ...... *G06F 17/2288* (2013.01); *G06F 17/2247* (2013.01); *G06K 9/00469* (2013.01); *G06K 9/00483* (2013.01)

(58) Field of Classification Search

CPC ........................................ G06F 17/21–17/2294
See application file for complete search history.

(56) References Cited

U.S. PATENT DOCUMENTS 7,802,305 B1 * 9/2010 Leeds ................. G06F 17/2735 715/230
8,136,029 B2 3/2012 Jagdale et al.
8,495,101 B2 7/2013 Koyanagi et al.
8,645,812 B1 * 2/2014 Leeds ................. G06F 17/2735 715/200
9,489,376 B2 * 11/2016 Thomason .......... G06F 17/2775
(Continued)

*Primary Examiner* — Keith Bloomquist
(74) *Attorney, Agent, or Firm* — Finnegan, Henderson, Farabow, Garrett & Dunner LLP

(57) ABSTRACT

System and method for enablement of data masking for web documents are disclosed. In an example, a rendering specification associated with reference web documents and previewed reference web documents are received. Further, a first web document processed based on the rendering specification is received. Furthermore, a status of the rendering specification is determined upon processing the first web document. In addition, the first web document and the previewed reference web documents are analyzed to determine a set of candidates for a sensitive label and/or data associated with a sensitive label in the first web document when the status of the rendering specification is a sensitive label not found and/or data associated with a sensitive label not found. The rendering specification is then updated upon determination. Masking of the data associated with sensitive labels in the first web document is then enabled using the updated rendering specification.

20 Claims, 12 Drawing Sheets

(56) References Cited

U.S. PATENT DOCUMENTS

2009/0228818 A1* 9/2009 Hebard ................. G06F 17/212
715/768
2009/0279116 A1* 11/2009 Nishio ................. G06K 9/2081
358/1.13
2009/0282011 A1* 11/2009 Saino .................... G06F 17/211
2011/0119576 A1* 5/2011 Aumann ............. G06F 17/2282
715/255
2011/0239113 A1* 9/2011 Hung .................... G06F 19/322
715/271
2012/0185763 A1 7/2012 Falkenberg et al.
2014/0351686 A1* 11/2014 Yawn .................... G06F 17/248
715/230
2015/0067886 A1 3/2015 Maman

* cited by examiner

300

```
<tr class="subgroupBackGround">
    <td nowrap class="labelText"><span class="xq">
            Account Number:</span></td>
    <td align="right" nowrap><table
            id="_id466__xo_" class="xiu p_AFReadOnly"
            cellpadding="0" cellspacing="0" border="0"
            summary="">
            <tr>
                <td class="xm" nowrap></td>
                <td valign="top" nowrap class="AFContentCell"><div
                        id="_id468" class="labelTextBold"
                        style="font-weight: bold:">5555 6666
                        2222 1111</div></td>
            </tr>
            <tr>
                <td></td>
                <td class="AFComponentMessageCell"><span
                    class="xkz"></span></td>
            </tr>
        </table></td>
    <td></td>
</tr>
```

```
<config
    hash=
    "9653d876a0c2ec7154ac96e365e67c6afc873c41f192f126b3b1a57412c6c29257335
    e3fe5f83f9760ac1a7e38d3ca6a74c52acf0989ddbafd8cf4cd062e507">
    <rules storyboard="page_identifier_0012020">
        <rule direction="down" labellength="14" type="text">
            <lpattern>Account\s*Number\s*|Account\s*Number\s*:\s*
            </lpattern>
            <vpattern>
            [0-9]{4}\s*[0-9]{4}\s*[0-9]{4}\s*[0-9]{4}\s*|[0-9]{13}
            </vpattern>
            <attrs />
            <context>
                <td nowrap class="labelText"><span class="xq">?
                </span></td>
            </context>
            <action method="substitution" type="mask">
                <params>all,all,X</params>
            </action>
        </rule>
    </rules>
```

```
<td nowrap class="labelText"><span class="xq">
        ??</span></td>
<td align="right" nowrap><table
        id="_id468__xc_" class="xlu p_AFReadOnly"
        cellpadding="0" cellspacing="0" border="0"
        summary="">
        <tr>
            <td class="xm" nowrap></td>
            <td valign="top" nowrap class="AFContentCell"><div
                    id="_id468" class="labelTextBold"
                    style="font weight: bold;">??
                    </div></td>
        </tr>
        <tr>
            <td></td>
            <td class="AFComponentMessageCell"><span
                class="x8z"></span></td>
        </tr>
    </table></td>
<td></td>
```

```
<td nowrap class="labelText"><div class="xq">Acc. Number</div></td>
<td align="right" nowrap>
<table id="_id468_xc_" class="x1u p_AFReadOnly" cellpading="0"
cellspacing="0" border="0" summary="0">
    <tr>
        <td class="xu" nowrap></td>
        <td nowrap valign="top" class="AFContentCell"><div id=
        "_id468" class="labelTextBold" style="font-weight:bold;"
        ></div></td>
    </tr>
    <tr>
        <td></td>
        <td class="AFComponentMessageCell"><div class="x8z">5555
        6666 2222 1111</div></td>
    </tr>
</table>
```

```
<td nowrap class="labelText"><div class="xg">Acc. Number</div></td>
```

```
<td nowrap class="labelText">Acc. Number</td>
```

SYSTEM AND METHOD FOR ENABLEMENT OF DATA MASKING FOR WEB DOCUMENTS

PRIORITY CLAIM

This U.S. patent application claims priority under 35 U.S.C. §119 to India Application No. 4444/MUM/2015, filed on Nov. 26, 2015. The entire contents of the aforementioned application are incorporated herein by reference.

TECHNICAL FIELD

The embodiments herein generally relate to web documents, and, more particularly, to system and method for enablement of data masking for the web documents.

BACKGROUND

Typically, organizations possess huge amounts of data related to various aspects of their business, such as employees, business partners, operations, and management, stored in databases of content sources. Data stored in the databases is often used for different purposes, such as testing, training, demonstration, and data research, and may be accessed by people within the organization as well as outside the organization. The data stored in the databases is also accessible as web content over web documents or through other interfaces. The web content represented over the web documents thus contains both sensitive and non-sensitive data. Accordingly, care needs to be taken to ensure that at least the sensitive data is inaccessible to unauthorized people, either from within the organization or from outside. A failure to do so may result in the theft of data or unnecessary disclosure of sensitive information. For example, a sensitive data used for a bank may include customer's data, such as name, account number, credit card number, debit card number, and address of the customers. In many scenarios, to carry out the day-to-day operations of the bank or other organizations, revealing the identity of customers through the customer's data is not acceptable. However, in many situations, such as for training and testing purposes, the customer's data may have to be shared with other employees, even if the employees are not authorized to access the data. This may lead to disclosure of the sensitive data.

In order to overcome the above issues, existing techniques perform masking of the sensitive data in the web document. However, the existing techniques may not be able to perform masking of the sensitive data when there is a change in the sensitive data and/or a change in a structure of the web document.

SUMMARY

Embodiments of the present disclosure present technological improvements as solutions to one or more of the above-mentioned technical problems recognized by the inventors in conventional systems. In view of the foregoing, embodiments herein provide a system and method for enablement of data masking for web documents.

In one embodiment, a method for enablement of data masking for web documents is disclosed. In this embodiment, a rendering specification associated with multiple reference web documents and previewed reference web documents are received. The rendering specification is for data associated with sensitive labels in the multiple reference web documents. The data associated with the sensitive labels is determined sensitive based on one or more user-defined policy rules. Further, a first web document processed based on the rendering specification is received, the first web document includes one or more sensitive labels and data associated with the sensitive labels. Furthermore, a status of the rendering specification is determined upon processing the first web document.

Moreover, the first web document and the multiple previewed reference web documents are analyzed when the status of the rendering specification is sensitive label not found and/or data associated with a sensitive label not found. The first web document and the multiple previewed reference web documents are analyzed to determine a set of candidates for a sensitive label and/or a set of candidates for data associated with a sensitive label in the first web document. In addition, the rendering specification is updated upon determining the set of candidates for a sensitive label and/or the set of candidates for data associated with the sensitive label in the first web document. Also, masking of the data associated with the sensitive labels in the first web document is enabled using the updated rendering specification.

In another embodiment, a system for enablement of data masking for web documents is disclosed. In this embodiment, the system includes one or more processors and a memory communicatively coupled to the processors. The memory includes a data masking enabling module. In an example implementation, the data masking enabling module receives a rendering specification associated with multiple reference web documents and previewed reference web documents. The rendering specification is for data associated with sensitive labels in the multiple reference web documents. The data associated with the sensitive labels is determined sensitive based on one or more user-defined policy rules. Further, the data masking enabling module receives a first web document processed based on the rendering specification, the first web document includes one or more sensitive labels and data associated with the sensitive labels. Furthermore, the data masking enabling module determines a status of the rendering specification upon processing the first web document.

Moreover, the data masking enabling module analyzes the first web document and the multiple previewed reference web documents when the status of the rendering specification is sensitive label not found and/or data associated with a sensitive label not found. The first web document and the multiple previewed reference web documents are analyzed to determine a set of candidates for a sensitive label and/or a set of candidates for data associated with a sensitive label in the first web document. In addition, the data masking enabling module updates the rendering specification upon determining the set of candidates for a sensitive label and/or the set of candidates for data associated with the sensitive label in the first web document. Also, the data masking enabling module enables masking of the data associated with the sensitive labels in the first web document using the updated rendering specification.

In yet another embodiment, a non-transitory computer readable medium embodying a program executable in a computing device is disclosed. In this embodiment, the program includes a program code for receiving a rendering specification associated with multiple reference web documents and previewed reference web documents, the rendering specification is for data associated with sensitive labels in the multiple reference web documents and the data associated with the sensitive labels is determined sensitive based on at least one user-defined policy rules. Further, the program includes a program code for receiving a first web document processed based on the rendering specification, the first web document comprises at least one sensitive label and data associated with the at least one sensitive label.

Furthermore, the program includes a program code for determining a status of the rendering specification upon processing the first web document. Moreover, the program includes a program code for analyzing the first web document and the multiple previewed reference web documents when the status of the rendering specification is at least one of a sensitive label not found or data associated with a sensitive label not found, analyzing the first web document and the multiple previewed reference web documents to determine at least one of a set of candidates for a sensitive label and a set of candidates for data associated with a sensitive label in the first web document. In addition, the program includes a program code for updating the rendering specification upon determining at least one of the set of candidates for a sensitive label and the set of candidates for data associated with the sensitive label in the first web document. Also, the program includes a program code for enabling masking of the data associated with the at least one sensitive label in the first web document using the updated rendering specification.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 illustrates a HTML source code of an underlined portion in the HTML web document of FIG. 3, according to some embodiments of the present disclosure;

FIG. 5 illustrates a rendering specification of a sensitive label "Account number" of FIG. 3, according to some embodiments of the present disclosure;

FIGS. 6A-6C illustrate various types of context queries, according to some embodiments of the present disclosure;

FIG. 9 illustrates a HTML source code of the modified HTML web document, according to some embodiments of the present disclosure;

FIG. 10 illustrates a portion of the HTML source code of FIG. 9, according to some embodiments of the present disclosure;

FIG. 11 illustrates a modified portion of the HTML source code of FIG. 10, according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The terms "sensitive data" and "data associated with sensitive labels" are used interchangeably throughout the document. The terms "update" and "change" are used interchangeably throughout the document.

Figure 1:
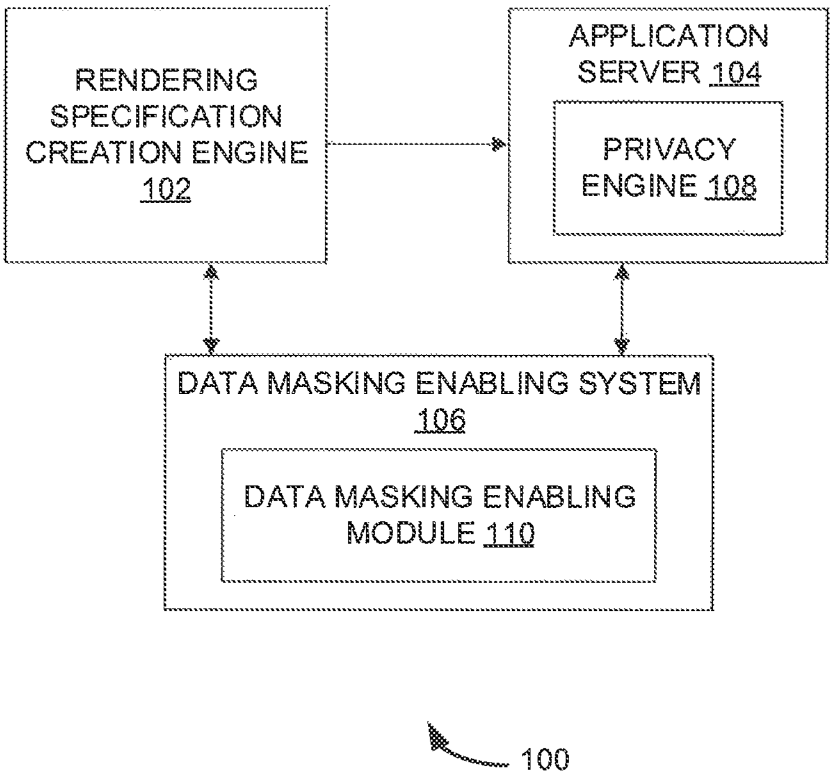
FIG. 1 illustrates a system for data masking of web documents, according to some embodiments of the present disclosure.

FIG. 1 illustrates a system 100 for data masking of web documents, according to some embodiments of the present disclosure. As shown in FIG. 1, the system 100 includes a rendering specification creation engine 102, an application server 104 and a data masking enabling system 106. Further, the application server 104 includes a privacy engine 108. Furthermore, the data masking enabling system 106 includes a data masking enabling module 110.

In operation, the rendering specification creation engine 102 creates a rendering specification for a reference web document. The rendering specification is for data associated with sensitive labels in the reference web document and the data associated with the sensitive labels is determined sensitive based on one or more user-defined policy rules. For example, the sensitive labels may represent a text, an image, a functional button, a navigation link, a text-area, a selection box and the like. The rendering specification includes information associated with sensitive label nodes in a web document, neighbor information associated with sensitive label nodes, neighbor information of data associated with sensitive labels, and Information associated with a structure of the web document. Further, the rendering specification creation engine 102 applies the created rendering specification on the reference web document to obtain previewed web documents.

Further, the privacy engine 108 deployed in the application server 104 or in a network as proxy identifies and mask sensitive data in an application response (i.e., a web document) using the rendering specification created by the rendering specification creation engine 102. Basically, the privacy engine 108 process the web document by applying the rendering specification. For example, the web document includes one or more sensitive labels and data associated with the sensitive labels. In an example, the privacy engine 108 can apply the rendering specification on the web document when there is a change in a structure of the web document in neighborhood of a sensitive label and/or data associated with the sensitive label. However, the privacy engine 108 cannot apply the rendering specification when there is change in a sensitive label, change in data associated with a sensitive label or a change in a structure of the web document.

In such scenarios, the data masking enabling system 106 enables data masking for the web document if the privacy engine 108 fails. In an example embodiment, the data masking enabling module 110 receives the rendering specification associated with the reference web document and previewed web document. Further, the data masking enabling module 110 receives the web document processed based on the rendering specification. In some embodiments, the data masking enabling module 110 analyzes the multiple previewed reference web documents to determine user-defined policy rules. The data masking enabling module 110 then determines existence of a sensitive label in the first web document using the user-defined policy rules. The data masking enabling module 110 then send an alert to the user when the sensitive label exists in the first web document.

Furthermore, the data masking enabling module 110 determines a status of the rendering specification upon processing the first web document. Moreover, the data masking enabling module 110 analyzes the first web document and the multiple previewed reference web documents when the status of the rendering specification is a sensitive label not found and/or data associated with a sensitive label not found. For example, the data masking enabling module 110 analyzes the first web document and the multiple previewed reference web documents to determine a set of candidates for a sensitive label and/or a set of candidates for data associated with a sensitive label in the first web document.

In an example, the status of the rendering application is the sensitive label not found when the sensitive label is updated. In this example, the data masking enabling module 110 matches the web document with the previewed reference web document to obtain a sensitive label node in the previewed reference web document. Further, the data masking enabling module 110 determines a context query for the sensitive label node using neighbor information in the rendering specification for the sensitive label node. Furthermore, the data masking enabling module 110 executes the context query on the web document to determine the set of candidates for the updated sensitive label in the web document. In an embodiment, the data masking enabling module 110 matches the context query for the sensitive label node against the web document and determines the set of candidates for the updated sensitive label based on the matching.

In another example, the status of the rendering specification is the data associated with the sensitive label not found when the data associated with the sensitive label is updated. In this example, the data masking enabling module 110 matches the web document with the previewed reference web document to obtain a sensitive label node in the previewed reference web document. Further, the data masking enabling module 110 determines a context query for the data associated with the sensitive label node using neighbor information in the rendering specification for the sensitive label node. Furthermore, the data masking enabling module 110 executes the context query on the web document to determine the set of candidates for the updated data associated with the sensitive label in the web document.

In yet another example, the status of the rendering specification is the data associated with the sensitive label not found when the structure of the web document is updated with the sensitive label and data associated with the sensitive label not changed or updated. In this example, the data masking enabling module 110 matches the web document with the previewed reference web document to obtain a sensitive label node. Further, the data masking enabling module 110 determines a set of candidates for the data associated with a sensitive label corresponding to the sensitive label node by increasing a search scope within the web document. Furthermore, the data masking enabling module 110 performs proximity analysis on the set of candidates for the data associated with the sensitive label to determine the correct candidate from the set of candidates for the data associated with the sensitive label.

In an example, the status of the rendering specification is the data associated with the sensitive label not found when a structure of the web document is updated with the sensitive label and data associated with the sensitive label changed. In this example, the data masking enabling module 110 matches the web document with the previewed reference web document to obtain a sensitive label node in the previewed reference web document. Further, the data masking enabling module 110 determines a context query for the sensitive label node using information in the rendering specification for the sensitive label node. Furthermore, the data masking enabling module 110 extracts information associated with each node in the web document. In addition, the data masking enabling module 110 matches the context query of the rendering specification with the extracted information to determine a set of candidates for the updated sensitive label and/or the updated data associated with the sensitive label.

In addition, the data masking enabling module 110 updates the rendering specification upon determining the set of candidates for a sensitive label and/or the set of candidates for data associated with the sensitive label in the web document. Also, the data masking enabling module 110 enables masking of the data associated with the sensitive labels in the web document using the updated rendering specification. This is explained in more detailed with reference to FIG. 2.

Figure 2:
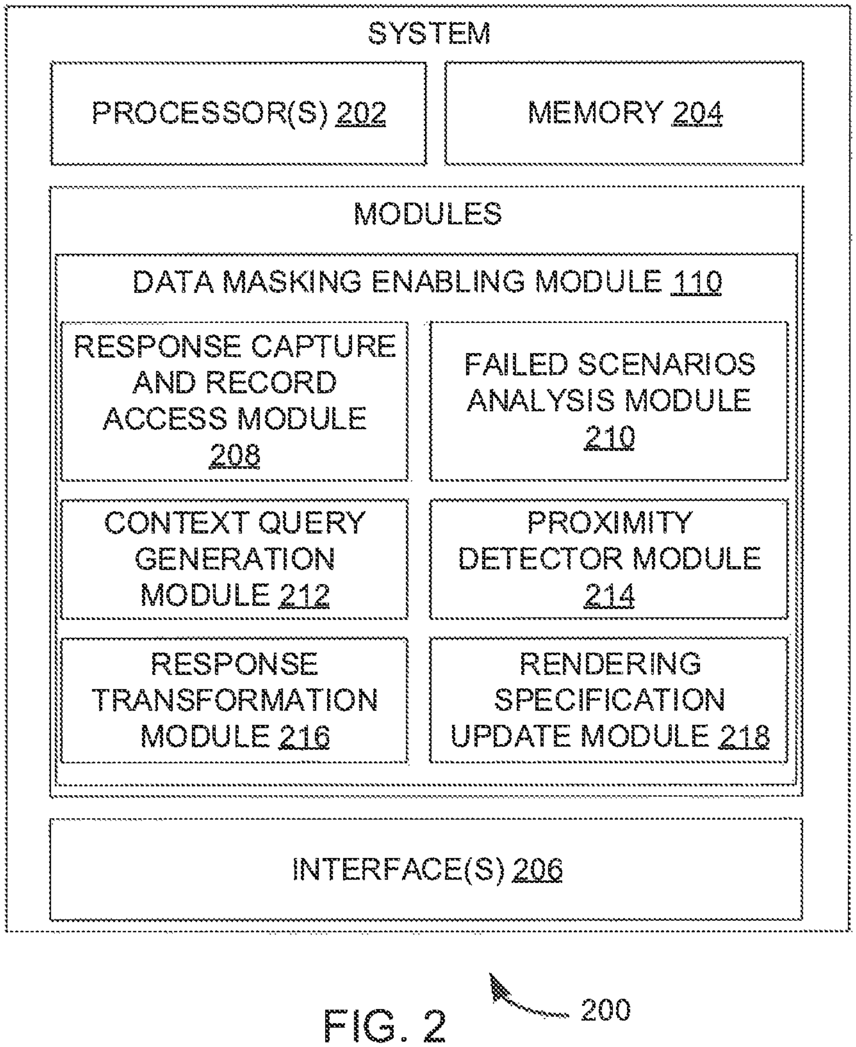
FIG. 2 illustrates a detailed block diagram of a data masking enabling system of FIG. 1, according to some embodiments of the present disclosure.

FIG. 2 illustrates a block diagram of a data masking enabling system 200 (e.g., the data masking enabling system 106 of FIG. 1), according to some embodiments of the present disclosure. As shown in FIG. 2, the system 200 includes one or more processor(s) 202 and a memory 204 communicatively coupled to each other. The system 200 also includes interface(s) 206. Further, the memory 204 includes modules the data masking enabling module 110 and other modules. The data masking enabling module 110 includes a response capture and record access module 208, a failed scenarios analysis module 210, a context query generation module 212, a proximity detector module 214, a response transformation module 216 and a rendering specification update module 218. Although FIG. 2 shows example components of the system 200, in other implementations, the system 200 may contain fewer components, additional components, different components, or differently arranged components than depicted in FIG. 2.

The processor(s) 202 and the memory 204 may be communicatively coupled by a system bus. The processor(s) 202 may include circuitry implementing, among others, audio and logic functions associated with the communication. The processor(s) 202 may include, among other things, a clock, an arithmetic logic unit (ALU) and logic gates configured to support operation of the processor(s) 202. The processor(s) 202 can be a single processing unit or a number of units, all of which include multiple computing units. The processor(s) 202 may be implemented as one or more hardware processors, microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions and data stored in the memory 204.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 206 may include a variety of software and hardware interfaces, for example, interfaces for peripheral device(s), such as a keyboard, a mouse, an external memory, and a printer. The interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 206 may include one or more ports for connecting the system 200 to an application server and a rendering specification creation engine (as shown in FIG. 1).

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 204, may store any number of pieces of information, and data, used by the system 200 to implement the functions of the system 200. The memory 204 may be configured to store information, data, applications, instructions or the like for enabling the system 200 to carry out various functions in accordance with various example embodiments. Additionally or alternatively, the memory 204 may be configured to store instructions which when executed by the processor(s) 202 causes the system 200 to behave in a manner as described in various embodiments. The memory 204 includes the response capture and record access module 208, the failed scenarios analysis module 210, the context query generation module 212, the proximity detector module 214, the response transformation module 216, the rendering specification update module 218 and other modules. The modules 208 to 218 include routines, programs, objects, components, data structures, etc., which perform particular tasks or implement particular abstract data types. The other modules may include programs or coded instructions that supplement applications and functions of the system 200.

In an embodiment, the response capture and record access module 208 obtains a processed web document from a privacy engine in the application server (e.g., the privacy engine 108 of FIG. 1) along with a status of a rendering specification. The web document can be fully or partially processed. For example, the status of the rendering specification may include a success status and a failed status. The success status means the rendering specification configured for the web document is properly applied. The failed status means at least a part of the rendering specification could not be applied. For the rendering specification with the failed status, the failed scenario analysis module 210 assigns one of two status, sensitive label not found and data associated with a sensitive label not found. If content of a sensitive label is changed (i.e., the sensitive label is updated), the privacy engine cannot find the sensitive label in the parsed web document. In that case, the rendering specification is assigned 'sensitive label not found' status. If the sensitive label is not found, the data corresponding to that sensitive label is not searched. When rendering specification is assigned 'sensitive value not found' when the data associated with the sensitive label is updated or a structure of web document is changed with or without updating a sensitive label and/or data associated with a sensitive label. The structure of the web document may be changed in such a way that it no longer fits in an interpretation of direction.

Figure 3:
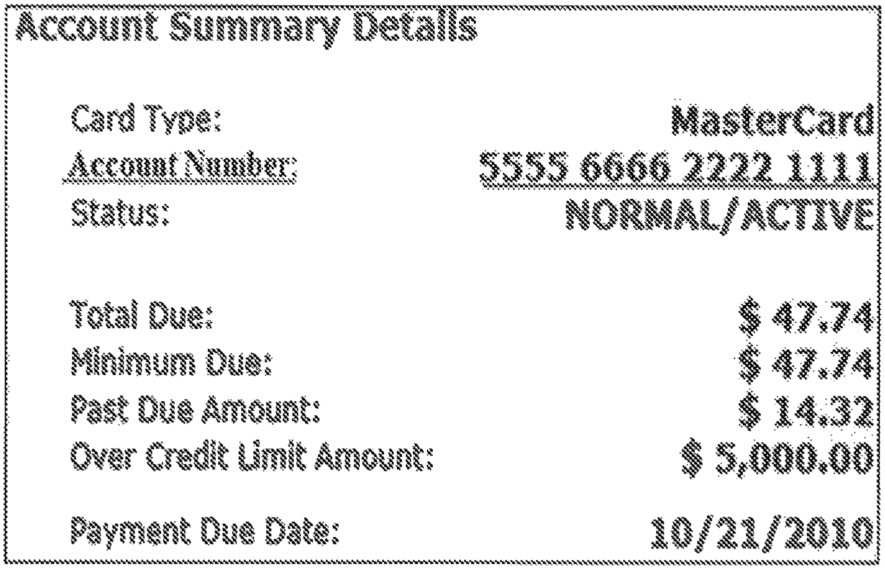
FIG. 3 illustrates a portion of a hypertext markup language (HTML) web document, according to some embodiments of the present disclosure.
Figure 6A:
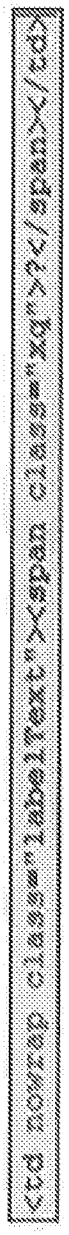
Figure 6B:
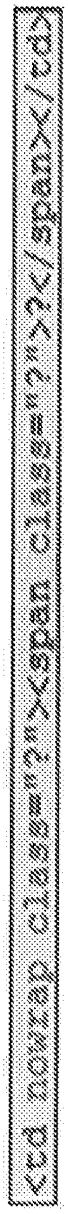

Further, if the rendering specification failed due to change in the sensitive label or data associated with the sensitive label, the context query generation module 212 determines new or updated sensitive label or data associated with the sensitive label. The context query generation module 212 then executes the context query against the processed web document (recorded by the privacy engine). The result of context query gives a set of candidates for the updated sensitive label or data associated with the sensitive label. For example, a portion of a hypertext markup language (HTML) page 300 of the web document is shown in FIG. 3 and a HTML source code 400 of an underlined portion of FIG. 3 is shown in FIG. 4. The rendering specification 500 for "Account Number" sensitive label of FIG. 3 is shown in FIG. 5 which is generated by the rendering specification creation engine (e.g., the rendering specification creation engine 102 of FIG. 1). In this example, if "Account Number." is changed to "Acc. Number", then the above rendering specification of FIG. 5 cannot identify the sensitive label and the status is recorded as the failed status. In such scenarios, the context query generation module 212 searches in a structure of the web document, particularly, in a HTML web document to identify the set of candidates for the updated sensitive label through a context query. The context query may be neighbor information captured by the rendering specification creation engine during the rendering specification creation process. The context query generation module 212 generates the context query for the HTML web document. For example, a HTML web document 400 of FIG. 4 shows the context query within a context tag. Examples of context queries 600A-600C are shown in FIGS. 6A-6C, respectively. In this example, FIG. 6A depicts a literal context query 600A, FIG. 6B depicts a parameterized context query 600B and FIG. 6C depicts the parameterized context query 600C with an increased horizontal scope. Second 'td' in FIG. 6C is sibling of 'td' shown in FIG. 6B. Therefore, FIG. 6C is referred to as the parameterized context query with the increased horizontal scope. The change in the context query from the literal context query to parameterized with increase scope is done incrementally. The literal context query match is more accurate and generates less number of candidates then the parameterized context query because the probability of matching larger number of segments of the HTML web document for the parameterized context query is more. The context query generation module 212 may allow the end user to generate a custom context query by selecting or removing attributes from the context query. Some of attributes of FIG. 6C are ID, class, cellpadding and the like.

Further, the context query generation module 212 executes the context query against the HTML web document and the set of candidates matching the context query is determined. In an example, the execution of the context query includes fetching a list of nodes matching a top node of the context query. For example, in FIGS. 6A-6C, a top node of context queries is "td". In this example, the context query generation module 212 extracts a list of nodes by executing the Document Object Model (DOM) API such as getElementByTagName. Once the list of nodes is extracted through the API, then the context query generation module 212 matches the list of nodes against the nodes of the context query. The context query generation module 212 then considers the nodes matching the context query as the set of candidates. The content marked as "?" in the context query are ignored in matching process. Marking some parts as "?" (ignore) in the context query is to ignore minor changes done to the HTML web document without impacting search process. The above process steps are repeated for determining the set of candidates for the data associated with the sensitive label.

Figure 7:
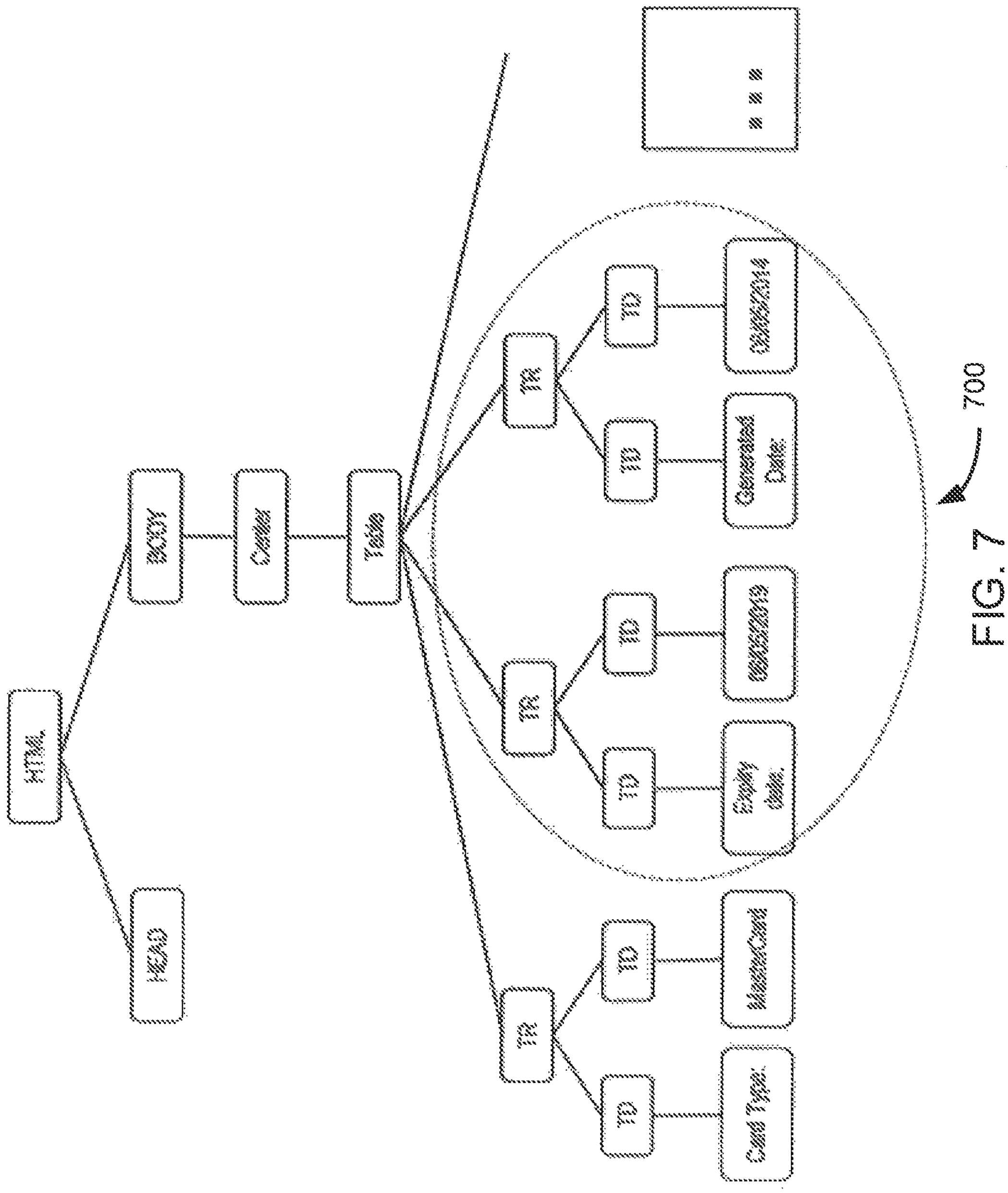
FIG. 7 illustrates a HTML web document in a tree form, according to some embodiments of the present disclosure.
Figure 8:
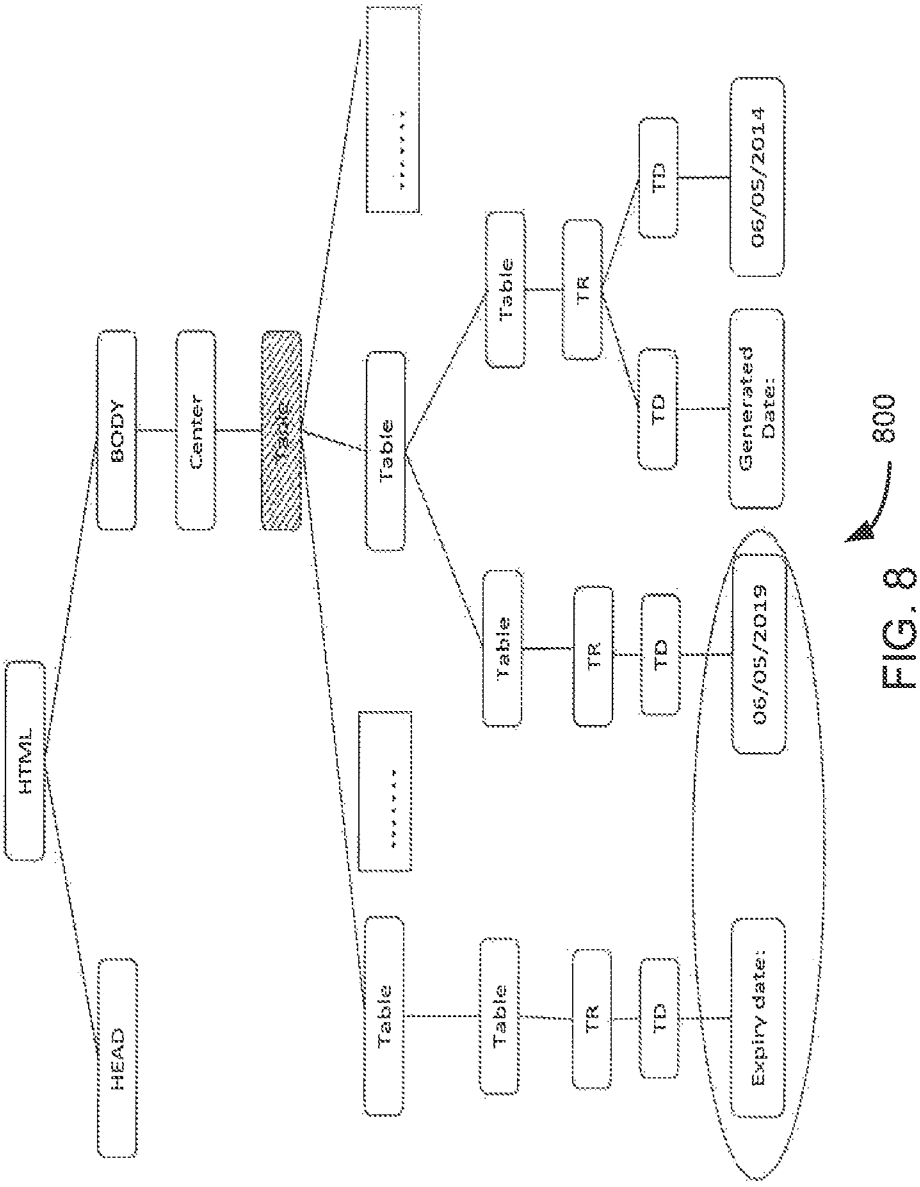
FIG. 8 illustrates a modified HTML web document in a tree form, according to some embodiments of the present disclosure.

In addition, if rendering specification failed due to change in the structure of the web document (a sensitive label and data associated with the sensitive label are not changed) which causes the interpretation of direction to fail, then the proximity detector module 214 increases a scope of search for data associated with the sensitive label keeping the sensitive label as a reference. As shown in FIG. 7, 'Expiry date' sensitive label has only one value associated with it. FIG. 7 shows a HTML web document 700 in a tree form. A HTML web document 800 in FIG. 8 is changed or modified to incorporate new content and to maintain layout. The display of both HTMLs in FIGS. 7 and 8 are not changed due to additional layout but their internal (tree) representations are changed. If a rendering specification is created for "Expiry Date" sensitive label with 'right' direction, the privacy engine can process and hide the 'Expiry Date' data '06/05/2019' as shown in FIG. 7. But with changed structure of the HTML web document and its tree representation (FIG. 8), the privacy engine fails to protect the data corresponding to sensitive label 'Expiry Date' even though the sensitive label and corresponding data is not changed. In such scenario, the proximity detector module 214 increases the search scope by searching in a bigger chunk of tree. As per FIG. 8, to obtain the data for 'Expiry Date', search is performed from entire tree rooted at 'Table' node (highlighted). If search is carried out in the tree rooted at 'Table' then two candidates matching 'Expiry Date' are found ('06/05/2019' and '06/05/2014') and one of the two candidates belongs to 'Generated Date:' label. In order to select one candidate for 'Expiry Date' from the two possible date, the proximity detector module 214 performs proximity analysis for 'Expiry Date'. For example, the proximity detector module 214 performs proximity analysis in multiple ways. In an example, the proximity detector module 214 performs proximity analysis by comparing location information of both the candidates. In an example, location information (e.g., XPath) for node '06/05/2019' is/html/body/center/table/table[4]/table/tr/td/ and location information for node '06/06/2014' it is/html/body/center/table/table[4]/table[2]/tr/td. The location information of both the candidates differ at sixth node from the top and the index (location) with siblings suggest which value node is nearer to the sensitive label 'Expiry Date'. The proximity detector module 214 then displays all the matching candidates but recommends the nearest one. The end user may select the most appropriate from a given list of matching candidates.

In another embodiment, if the sensitive label and data associated with the sensitive label are changed along with their neighborhood, the response transformation module 216 extracts portions of the processed web document which is in a form of a tree on which the rendering specification is successfully applied and the reference web document. The response transformation module 216 extracts portions of the tree which includes a sensitive label and corresponding data and all the branches connecting the sensitive label and corresponding data. The extracted portions from the reference web document is referred as input trees and the portions of the web document is referred as target trees. In an example, the response transformation module 216 matches each input tree to the web document. The response transformation module 216 then extracts the portions (target trees) from the web document partially matching the input tree. The response transformation module 216 then obtains a sensitive label node from the input tree. Further, the response transformation module 216 obtains a context query of the sensitive label from the rendering specification. For each leaf node in the target tree, the response transformation module 216 obtains their neighborhood information equal in size to the context query. The response transformation module 216 then apply substitution operations on the extracted neighborhood. If the context query of rendering specification and extracted neighborhood is same, then mark the leaf node as a potential sensitive label. If the substitution operations do not generate required context query, the response transformation module 216 applies the insertion operations on the extracted neighborhood. The response transformation module 216 then matches the context query of the rendering specification and extracted neighborhood after the insertion operations. The response transformation module 216 marks the leaf node as a potential sensitive label when there is a match between the context query of the rendering specification and extracted neighborhood after the Insertion operations. If insertion operations do not generate required context query, the response transformation module 216 applies the deletion operations on the extracted neighborhood. The response transformation module 216 then matches the context query of the rendering specification and extracted neighborhood after the deletion operations. The response transformation module 216 marks the leaf node as a potential sensitive label when there is a match between the context query of the rendering specification and extracted neighborhood after the deletion operations. In some embodiments, a combination of substitution, insertion and/or deletion operations is applied on the input tree to obtain the target tree or a combination of substitution, insertion and/or deletion operations is applied on the target tree to obtain the input tree.

In an example, FIG. 9 illustrates a modified HTML web document 900 of FIG. 4 'Account Number:' has been changed to 'Acc. Number' and the parent node is changed from 'span' to 'div'. A portion of the HTML web document 1000 of the HTML web document 900 of FIG. 9 is shown in FIG. 10. Using the previewed web document as a reference to match the web document (a portion of which is shown in FIG. 9), the response transformation module 216 obtains two trees, FIGS. 9 and 10, respectively, from the web document. FIG. 10 has the same size as the context query mentioned in FIG. 6A or FIG. 6B. If the response transformation module 216 applies substitution operations on FIG. 10 by changing a node to 'span' from 'div' and replacing the leaf node 'Acc. Number' with unknown parameter '?', the source code of FIG. 10 becomes the literal context query of FIG. 6A. From the literal context query, the parameterized context query or the context query with the increased horizontal scope can be created. Then the response transformation module 216 executes the new created context query to determine the potential sensitive label candidates.

In another example, a modified portion of the HTML source code of FIG. 4 is shown in FIG. 11. The modified portion of the HTML source code 1100 includes the parent 'span' node of 'Account Number' changed to 'Acc. Number'. The response transformation module 216 performs the deletion operations on the original HTML source code of FIG. 4 and produces the HTML source code of FIG. 11. To get the context query for FIG. 11, the response transformation module 216 perform an insertion operation on FIG. 11 or a deletion operation on FIG. 4. Further, the response transformation module 216 executes the created context query to determine the potential sensitive label candidates. Furthermore, the response transformation module 216 displays the list of potential sensitive labels for the end user selects the sensitive label from the list of sensitive labels. The response transformation module 216 repeats the above process for the data associated with the sensitive labels.

Upon determining the updated sensitive labels or data associated with the sensitive labels, the rendering specification update module 218 updates the rendering specification with updated sensitive labels or data associated with the sensitive labels. The rendering specification update module 218 enables the privacy engine for data masking of the data associated with the sensitive labels of the web document using the updated rendering specification.

Figure 12:
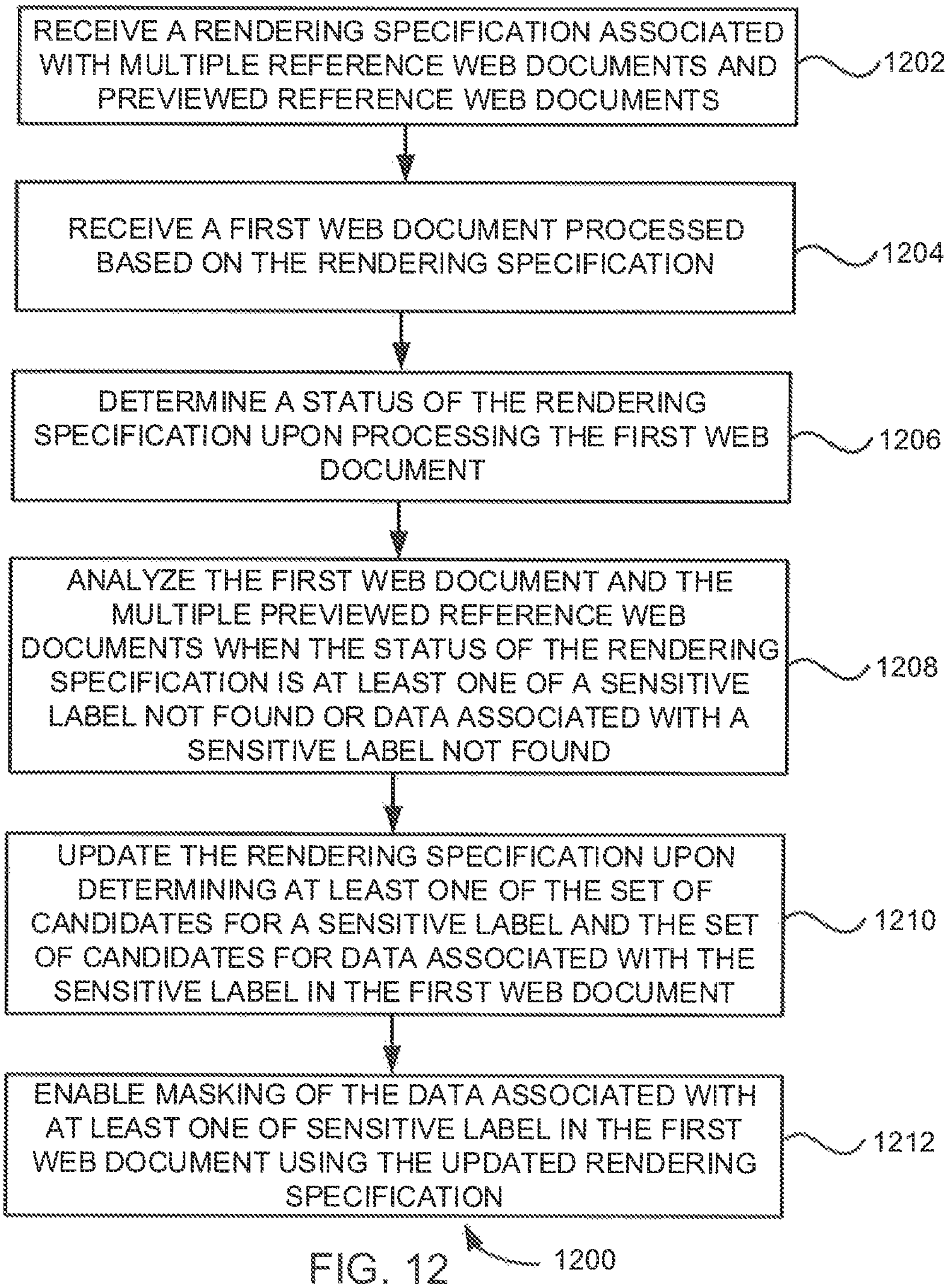
FIG. 12 is a flow chart illustrating a method for enablement of data masking for web documents, according to some embodiments of the present disclosure.

FIG. 12 is a flow chart 1200 illustrating a method for enablement of data masking for web documents, according to some embodiments of the present disclosure. At block 1202, a rendering specification associated with multiple reference web documents and previewed reference web documents are received. For example, the rendering specification is for data associated with sensitive labels in the multiple reference web documents and the data associated with the sensitive labels is determined sensitive based on at least one user-defined policy rules. The rendering specification comprises information associated with sensitive label nodes in a web document, neighbor information associated with sensitive label nodes, neighbor information of data associated with sensitive labels, and information associated with a structure of the web document. At block 1204, a first web document processed based on the rendering specification is received, the first web document includes one or more sensitive labels and data associated with the sensitive labels. At block 1206, a status of the rendering specification is determined upon processing the first web document. In some embodiments, the multiple previewed reference web documents are analyzed to determine user-defined policy rules. Existence of a sensitive label in the first web document is then determined using the user-defined policy rules. An alert is then sent to the user when the sensitive label exists in the first web document.

At block 1208, the first web document and the multiple previewed reference web documents are analyzed when the status of the rendering specification is a sensitive label not found and/or data associated with a sensitive label not found. The first web document and the multiple previewed reference web documents are analyzed to determine a set of candidates for a sensitive label and/or a set of candidates for data associated with a sensitive label in the first web document.

In an example, the status of the rendering application is the sensitive label not found when the sensitive label is updated. In this example, the first web document is matched with the previewed reference web documents to obtain a sensitive label node in the previewed reference web documents. Further, a context query for the sensitive label node is determined using neighbor information in the rendering specification for the sensitive label node. Furthermore, the context query is executed on the first web document to determine the set of candidates for the updated sensitive label in the first web document. In an embodiment, the context query for the sensitive label node is matched against the first web document and the set of candidates for the updated sensitive label are determined based on the matching.

In another example, the status of the rendering specification is the data associated with the sensitive label not found when the data associated with the sensitive label is updated. In this example, the web document is matched with the previewed reference web documents to obtain a sensitive label node in the previewed reference web documents. Further, a context query for the data associated with the sensitive label node is determined using neighbor information in the rendering specification for the sensitive label node. Furthermore, the context query is executed on the first web document to determine the set of candidates for the updated data associated with the sensitive label in the first web document.

In yet another example, the status of the rendering specification is the data associated with the sensitive label not found when the structure of the first web document is updated with the sensitive label and data associated with the sensitive label not changed. In this example, the first web document is matched with the multiple previewed reference web documents to obtain a sensitive label node. Further, a set of candidates for the data associated with a sensitive label corresponding to the sensitive label node is increased by increasing a search scope within the first web document. Furthermore, proximity analysis is performed on the set of candidates for the data associated with the sensitive label to determine the correct candidate from the set of candidates for the data associated with the sensitive label.

In an example, the status of the rendering specification is the data associated with the sensitive label not found when a structure of the first web document is updated with the sensitive label and data associated with the sensitive label changed. In this example, the first web document is matched with the previewed reference web documents to obtain a sensitive label node in the previewed reference web documents. Further, a context query for the sensitive label node is determined using information in the rendering specification for the sensitive label node. Furthermore, information associated with each node in the first web document is extracted. In addition, the context query of the rendering specification is matched with the extracted information to determine a set of candidates for the updated sensitive label and/or the updated data associated with the sensitive label.

At block 1210, the rendering specification is updated upon determining the set of candidates for a sensitive label and/or the set of candidates for data associated with the sensitive label in the first web document. At block 1212 masking of the data associated with the sensitive labels in the first web document is enabled using the updated rendering specification.

The order in which the method(s) are described is not intended to be construed as a limitation, and any number of the described method blocks can be combined in any order to implement the method 1200, or an alternative method. Additionally, individual blocks may be deleted from the methods without departing from the spirit and scope of the subject matter described herein. Furthermore, the method 1200 can be implemented in any suitable hardware, software, firmware, or combination thereof.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method comprising:

receiving, by one or more hardware processors, a rendering specification associated with multiple reference web documents and previewed reference web documents, wherein the rendering specification is for data associated with sensitive labels in the multiple reference web documents and wherein the data associated with the sensitive labels is determined sensitive based on at least one user-defined policy rules;

receiving, by the one or more hardware processors, a first web document processed based on the rendering specification, wherein the first web document comprises at least one sensitive label and data associated with the at least one sensitive label;

determining, by the one or more hardware processors, a status of the rendering specification upon processing the first web document;

analyzing, by the one or more hardware processors, the first web document and the multiple previewed reference web documents when the status of the rendering specification is at least one of a sensitive label not found or data associated with a sensitive label not found, wherein analyzing the first web document and the multiple previewed reference web documents to determine at least one of a set of candidates for a sensitive label and a set of candidates for data associated with a sensitive label in the first web document;

updating, by the one or more hardware processors, the rendering specification upon determining at least one of the set of candidates for a sensitive label and the set of candidates for data associated with the sensitive label in the first web document; and enabling, by the one or more hardware processors, masking of the data associated with the at least one sensitive label in the first web document using the updated rendering specification.

2. The method of claim 1, wherein the status of the rendering application is the sensitive label not found when the sensitive label is updated.

3. The method of claim 2, wherein analyzing the first web document and the multiple previewed reference web documents when the status of the rendering specification is a sensitive label not found comprises:

matching the first web document with the multiple previewed reference web documents to obtain a sensitive label node in the multiple previewed reference web documents;

determining a context query for the sensitive label node using neighbor information in the rendering specification for the sensitive label node; and executing the context query on the first web document to determine a set of candidates for the updated sensitive label in the first web document.

4. The method of claim 3, wherein executing the context query on the first web document to determine the set of candidates for the updated sensitive label in the first web document, comprises:

matching the context query for the sensitive label node against the first web document; and determining the set of candidates for the updated sensitive label based on the matching.

5. The method of claim 1, wherein the status of the rendering specification is the data associated with the sensitive label not found when at least one of the data associated with the sensitive label is updated, a structure of the first web document is updated with the sensitive label and data associated with the sensitive label not changed, and a structure of the first web document is updated with the sensitive label and data associated with the sensitive label changed.

6. The of claimed in claim 5, wherein analyzing the first web document and the multiple previewed reference web documents when the status of the rendering specification is the data associated with the sensitive label not found comprises:

matching the first web document with the multiple previewed reference web documents to obtain a sensitive label node in the multiple previewed reference web documents;

determining a context query for the data associated with the sensitive label node using neighbor information in the rendering specification for the sensitive label node; and executing the context query on the first web document to determine a set of candidates for the updated data associated with a sensitive label in the first web document.

7. The of claimed in claim 5, wherein analyzing the first web document and the multiple previewed reference web documents when the structure of the first web document is updated with the sensitive label and data associated with the sensitive label not changed comprises:

matching the first web document with the multiple previewed reference web documents to obtain a sensitive label node;

determining a set of candidates for the data associated with a sensitive label corresponding to the sensitive label node by increasing a search scope within the first web document; and performing proximity analysis on the set of candidates for the data associated with the sensitive label to determine the correct candidate from the set of candidates for the data associated with the sensitive label.

8. The method of claim 5, wherein analyzing the first web document and the multiple previewed reference web documents when the structure of the first web document is updated with the sensitive label and data associated with the sensitive label changed comprises:

matching the first web document with the multiple previewed reference web documents to obtain a sensitive label node in the multiple previewed reference web documents;

determining a context query for the sensitive label node using information in the rendering specification for the sensitive label node;

extracting information associated with each node in the first web document; and matching the context query of the rendering specification with the extracted information to determine a set of candidates for at least one of the updated sensitive label and the updated data associated with the sensitive label.

9. The method of claim 1, further comprising:

analyzing the multiple previewed reference web documents to determine user-defined policy rules;

determining existence of a sensitive label in the first web document using the user-defined policy rules; and sending an alert when the sensitive label exists in the first web document.

10. The method of claim 1, wherein the rendering specification comprises information associated with sensitive label nodes in a web document, neighbor information associated with sensitive label nodes, neighbor information of data associated with sensitive labels, and information associated with a structure of the web document.

11. A system comprising:

at least one processor; and a memory communicatively coupled to the at least one processor, wherein the memory includes a data masking enabling module to:

receive a rendering specification associated with multiple reference web documents and previewed reference web documents, wherein the rendering specification is for data associated with sensitive labels in the multiple reference web documents and wherein the data associated with the sensitive labels is determined sensitive based on at least one user-defined policy rules;

receive a first web document processed based on the rendering specification, wherein the first web document comprises at least one sensitive label and data associated with the at least one sensitive label;

determine a status of the rendering specification upon processing the first web document;

analyze the first web document and the multiple previewed reference web documents when the status of the rendering specification is at least one of a sensitive label not found or data associated with a sensitive label not found, wherein analyzing the first web document and the multiple previewed reference web documents to determine at least one of a set of candidates for a sensitive label and a set of candidates for data associated with a sensitive label in the first web document;

update the rendering specification upon determining at least one of the set of candidates for a sensitive label and the set of candidates for data associated with the sensitive label in the first web document; and enable masking of the data associated with the at least one sensitive label in the first web document using the updated rendering specification.

12. The system of claim 11, wherein the status of the rendering application is the sensitive label not found when the sensitive label is updated.

13. The system of claim 12, wherein the data masking enabling module is configured to:

match the first web document with the multiple previewed reference web documents to obtain a sensitive label node in the multiple previewed reference web documents;

determine a context query for the sensitive label node using neighbor information in the rendering specification for the sensitive label node; and execute the context query on the first web document to determine a set of candidates for the updated sensitive label in the first web document.

14. The system of claim 13, wherein the data masking enabling module is configured to:

match the context query for the sensitive label node against the first web document; and determine the set of candidates for the updated sensitive label based on the matching.

15. The system of claim 11, wherein the status of the rendering specification is the data associated with the sensitive label not found when at least one of the data associated with the sensitive label is updated, a structure of the first web document is updated with the sensitive label and data associated with the sensitive label not changed and a structure of the first web document is updated with the sensitive label and data associated with the sensitive label changed.

16. The system of claim 15, wherein the data masking enabling module is configured to:

match the first web document with the multiple previewed reference web documents to obtain a sensitive label node in the multiple previewed reference web documents;

determine a context query for the data associated with the sensitive label node using neighbor information in the rendering specification for the sensitive label node; and execute the context query on the first web document to determine a set of candidates for the updated data associated with a sensitive label in the first web document.

17. The system of claim 15, wherein the data masking enabling module is configured to:

match the first web document with the multiple previewed reference web documents to obtain a sensitive label node;

determine a set of candidates for the data associated with a sensitive label corresponding to the sensitive label node by increasing a search scope within the first web document; and perform proximity analysis on the set of candidates for the data associated with the sensitive label to determine the correct candidate from the set of candidates for the data associated with the sensitive label.

18. The system of claim 15, wherein the data masking enabling module is configured to:

match the first web document with the multiple previewed reference web documents to obtain a sensitive label node in the multiple previewed reference web documents;

determine a context query for the sensitive label node using information in the rendering specification for the sensitive label node;

extract information associated with each node in the first web document; and match the context query of the rendering specification with the extracted information to determine a set of candidates for at least one of the updated sensitive label and the updated data associated with the sensitive label.

19. The system of claim 11, wherein the data masking enabling module is further configured to:

analyze the multiple previewed reference web documents to determine user-defined policy rules;

determine existence of a sensitive label in the first web document using the user-defined policy rules; and send an alert when the sensitive label exists in the first web document.

20. A non-transitory computer readable medium embodying a program executable in a computing device, said program comprising:

a program code for receiving a rendering specification associated with multiple reference web documents and previewed reference web documents, wherein the rendering specification is for data associated with sensitive labels in the multiple reference web documents and wherein the data associated with the sensitive labels is determined sensitive based on at least one user-defined policy rules;

a program code for receiving a first web document processed based on the rendering specification, wherein the first web document comprises at least one sensitive label and data associated with the at least one sensitive label;

a program code for determining a status of the rendering specification upon processing the first web document;

a program code for analyzing the first web document and the multiple previewed reference web documents when the status of the rendering specification is at least one of a sensitive label not found or data associated with a sensitive label not found, wherein analyzing the first web document and the multiple previewed reference web documents to determine at least one of a set of candidates for a sensitive label and a set of candidates for data associated with a sensitive label in the first web document;

a program code for updating the rendering specification upon determining at least one of the set of candidates for a sensitive label and the set of candidates for data associated with the sensitive label in the first web document; and a program code for enabling masking of the data associated with the at least one sensitive label in the first web document using the updated rendering specification.

* * * * *